3,267,046
PROCESS FOR REGULATING THE MOLECULAR WEIGHT OF BASIC NITROGEN POLYCONDENSATES

Alberto Bonvicini, Terni, Italy, assignor to Montecatini Società Generale per l'Industria Mineraria e Chimica, Milan, Italy
No Drawing. Filed Dec. 17, 1962, Ser. No. 244,934
Claims priority, application Italy, Dec. 21, 1961, 22,746/61
10 Claims. (Cl. 260—2)

The present invention relates to a method which makes it possible to regulate the molecular weight of certain compounds obtained by condensation of epichlorohydrin with amino compounds.

More particularly, the present invention relates to a process for the regulation of the molecular weight of polycondensates obtained by reaction (in the presence or absence of solvents and condensing agents) of one or more primary $C_3$–$C_{30}$ or secondary $C_4$–$C_{60}$ aliphatic amines with epichlorohydrin and an aliphatic, aromatic or heterocyclic secondary diamine.

The preparation of basic nitrogen polycondensates can be carried out in various ways as described e.g. in U.S. patent applications Ser. No. 30,732, filed May 23, 1960, and No. 212,119, filed July 24, 1962. In U.S. patent application Ser. No. 124,346, filed July 17, 1961, there has been described an advantageous process wherein the synthesis of the said basic nitrogen polycondensates is carried out by reaction of one or more primary or secondary aliphatic amines with epichlorohydrin, this first condensation being followed by a further reaction with bis secondary diamines, such as piperazine and by the addition of an alkali or alkaline earth metal hydroxide and/or carbonate in order to neutralize the ionic chlorine formed.

The polycondensates thus obtained are particularly useful in the preparation of textile fibres and films from synthetic polymers such as polyolefins and acrylonitrile homopolymers or copolymers. These polycondensates function to increase the dye receptivity of the fibres, films, etc., especially to acid dyes.

Shaped articles such as fibres, tapes, etc. obtained from polypropylene consisting predominantly of isotactic macromolecules are of special interest.

It is an object of the present invention to provide a process for regulating the molecular weight of basic nitrogen polycondensates.

A further object is to provide a process for preparing polycondensates having a uniform and relatively low molecular weight coupled with excellent thermal stability and extrusion characteristics.

Other objects and advantages of the present invention will become apparent hereinafter.

I have now found that the size of the polycondensate molecule is related to the addition of basic compounds such as the alkali or alkali earth metal hydroxide, carbonate or bicarbonate, since the molecular weight of the polycondensate increases up to a maximum upon increasing the amount of the hydroxide or carbonate up to a given value above which the molecular weight decreases.

More particularly, it has been found that by using the theoretical amount of hydroxide, carbonate or bicarbonate needed for the complete neutralization of the ionic chlorine present, the molecular weight reaches given values. Upon adding an amount of basic compound higher than the theoretical amount needed for the neutralization, these values decrease, the decrease in the molecular weight being directly proportional to the excess of hydroxide or carbonate added.

The hydroxide carbonate or bicarbonate thus acts as a molecular weight regulator for the polycondensates.

The present invention therefore relates to the preparation of basic nitrogen polycondensate compounds obtained by polycondensation of (1) epichlorohydrin with (2) one or more primary $C_3$–$C_{30}$ or secondary $C_4$–$C_{60}$ aliphatic amines and (3) an aliphatic, aromatic or heterocyclic secondary diamine, wherein at the end of the polycondensation an amount of a basic substance such as an alkali or alkaline earth metal hydroxide, carbonate or bicarbonate higher than the amount needed theoretically for the complete neutralization of the ionic chlorine formed, is added to the reaction mass.

The excess of the basic compound can be between 1 and 100% over the theoretical amount needed for the neutralisation.

According to the present invention, there can be employed, for example, the hydroxides, carbonates or bicarbonates of sodium, potassium, lithium, ammonium, rubidium, cesium, calcium, strontium, barium and magnesium.

The production of a lower molecular weight polycondensate is particularly advantageous in the extrusion of the polycondensates in admixture with polyolefins or other synthetic polymers.

The use of these basic compounds in amounts higher than that theoretically required for neutralization also produces another significant advantage. Since the complete removal of the hydroxides, carbonates, etc. from the polycondensate is very difficult, the polycondensate surprisingly exhibits an increased thermal stability. Substantially the same stabilization effect is obtained by adding the basic hydroxide carbonate or bicarbonate to the polycondensate before the spinning operation.

The polycondensates obtained according to the present invention can be used for preparing fibres, films, tapes, other shaped articles and the like from synthetic polymers by mixing the polycondensate with the synthetic polymers. The polycondensate may be employed in the forms of powders, in solution or in the form of a granulated or sintered product. Some polycondensates show a softening point not above 120° C., an intrinsic viscosity (measured in a 1% isopropanol solution at 25° C.) of 0.05–0.5 and a nitrogen content up to 35%. The following examples are given to illustrate the invention without limiting its scope.

The specific viscosity of the polycondensates is used as the indication of their molecular weight.

Example 1

28.28 kg. of n-octadecylamine dissolved in 45 kg. of methanol are introduced into a 300-liter stainless steel reactor provided with an agitator, thermometer and feeding hopper.

19.45 kg. of epichlorohydrin are added to the solution which is kept at 25° C. while agitating.

The agitation is continued for two hours at 25–30° C. The temperature is then raised to 65° C. and the mass is agitated at this temperature for 8 hours.

After cooling to 25° C., 30.14 kg. of piperazine dissolved in 42 kg. of methanol are added.

Immediately thereafter, 22.7 kg. of epichlorohydrin are added dropwise over a period of 4 hours.

The reaction mass is kept at 25–40° C. for 90 minutes and the temperature is then raised to 65° C. and the mass is then kept at this temperature.

Sodium hydroxide is then added over a period of 8 hours and the mass is kept at 65° C. for 4 hours.

The mass is then placed in a 1000-liter stainless steel reactor containing 600 liters of water at 18° C.

The aqueous suspension is agitated for 2 hours and centrifuged. The resulting aqueous cake is washed with water and finally dried.

By varying the amount of alkali metal hydroxide, polycondensates having variable specific viscosities ($\eta_{sp}$, as determined in 1% solution in isopropanol at 25° C.) are obtained.

The characteristics of the polycondensates thereby obtained are reported in the following table:

TABLE 1

| Amount of NaOH added in kg. (theoretical amount for the neutralization=18.20 kg.) | $\eta_{sp}$ |
|---|---|
| 18.20 | 0.30 |
| 18.60 | 0.26 |
| 18.97 | 0.23 |
| 19.05 | 0.22 |
| 19.49 | 0.20 |

*Example 2*

28.28 kg. of n-octadecylamine dissolved in 45 kg. of methanol are introduced into a 300-liter stainless steel autoclave provided with agitator, thermometer and feeding hopper.

19.5 kg. of epichlorohydrin are added to the solution which is kept at 25° C. while agitating.

After agitation at 25–30° C. for 2 hours, the temperature is raised to 65° C. and the mass is kept in agitation at this temperature for 8 hours.

The mass is then cooled to 25° C. and 30.6 kg. of piperazine dissolved in 45 kg. of methanol are added.

Immediately thereafter, 23.5 kg. of epichlorohydrin are added dropwise over a period of 4 hours.

The reaction is continued at 25–40° C. for 90 minutes and the temperature is then raised to 65° C. and the reaction mass is kept at this temperature.

Sodium hydroxide is now added over a period of 8 hours and the mass is then kept at 65° C. for 4 hours.

The mass is placed in a 1000-liter stainless steel autoclave containing 550 liters of water at 18° C.

The aqueous suspension is agitated for 2 hours and then centrifuged. The aqueous cake is washed with water and finally dried.

By varying the amount of alkali metal hydroxide, polycondensates having variable $\eta_{sp}$ (determined in a 1% solution of isopropanol at 25° C.) are obtained.

The characteristics of the polycondensates obtained are reported in the following table:

TABLE 2

| Amount of NaOH added in kg. (theoretical amount required for the neutralization: 18.59 kg.) | $\eta_{sp}$ |
|---|---|
| 18.59 | 0.33 |
| 18.97 | 0.29 |
| 19.34 | 0.24 |

*Example 3*

28.3 kg. of n-octadecylamine dissolved in 45 kg. of methanol are introduced into a 300-liter stainless steel autoclave provided with agitator, thermometer and feeding hopper.

19.4 kg. of epichlorohydrin are added to the solution which is kept at 25° C. while agitating.

Agitation at 25–30° C. is continued for 2 hours. The temperature is then raised to 65° C. and the mass is kept in agitation at this temperature for 8 hours.

The mass is then cooled to 25° C. and 29.6 kg. of piperazine dissolved in 40 kg. of methanol are added.

Immediately thereafter, 23 kg. of epichlorohydrin are added dropwise over a period of 4 hours.

The reaction at 25–40° C. is continued for 90 minutes, the temperature is then raised to 65° C. and the reaction mass is kept at this temperature.

Sodium hydroxide is now added within a period of 8 hours and the mass is then kept at 65° C. for 4 hours.

The mass is placed in a 1000-liter stainless steel autoclave containing 600 liters of water at 16° C.

The aqueous suspension is agitated for 2 hours and centrifuged. The resulting aqueous cake is washed with water and dried.

By varying the amount of alkali metal hydroxide, polycondensates having a variable $\eta_{sp}$ (determined in a 1% solution in isopropanol at 25° C.) are obtained.

The characteristics of the polycondensates obtained are reported in the following table:

TABLE 3

| Amount of NaOH added in kg. (theoretical amount required for neutralization=18.33 kg.) | $\eta_{sp}$ |
|---|---|
| 18.51 | 0.42 |
| 19.11 | 0.22 |

*Example 4*

28.3 kg. of n-octadecylamine dissolved in 45 kg. of methanol are introduced into a 300-liter stainless steel reactor provided with agitator, thermometer and feeding hopper.

19.4 kg. of epichlorohydrin are added to the solution which is kept at 25° C. while agitating.

Agitation at 25–30° C. is continued for 2 hours; the temperature is then raised to 65° C. and the mass is agitated at this temperature for 8 hours.

The mass is then cooled to 25° C. and 28.9 kg. of piperazine dissolved in 41 kg. of methanol are added.

Immediately thereafter, 22.5 kg. of epichlorohydrin are added dropwise within 4 hours.

The mass is reacted at 25–40° C. for 90 minutes; the temperature is then raised to 65° C. and the reaction mass is then kept at this temperature.

Sodium hydroxide is now added over a period of 8 hours and the mass is then kept at 65° C. for 4 hours.

The mass is placed in a 1000-liter stainless steel reactor containing 600 liters of water at 18° C.

The aqueous suspension is agitated for 2 hours and centrifuged. The aqueous cake is washed with water and dried.

By varying the amount of alkali metal hydroxide, polycondensates having a variable $\eta_{sp}$ (determined in 1% solution of isopropanol at 25° C.) are obtained.

The characteristics of the polycondensates obtained are reported in the following table:

TABLE 4

| Amount of NaOH added in kg. (theoretical amount required for neutralization = 18.11 kg.) | $\eta_{sp}$ |
|---|---|
| 18.51 | 0.40 |
| 18.88 | 0.24 |

*Example 5*

33.3 kg. of n-dodecylamine dissolved in 50 kg. of methanol are introduced into a 400-liter stainless steel reactor provided with agitator, thermometer and feeding hopper.

33.3 kg. of epichlorohydrin are added to the solution, which is kept at 25° C. while agitating.

After agitation for 2 hours at 25–30° C., the temperature is raised to 65° C. and the mass is then kept in agitation at this temperature for 8 hours.

After cooling to 25° C., 51.6 kg. of piperazine dissolved in 80 kg. of methanol, are added.

Immediately thereafter, 38.85 kg. of epichlorohydrin are added dropwise over a period of 4 hours.

The mass is reacted at 25–40° C. for 90 minutes; the temperature is then raised to 65° C. and the reaction mass is kept at this temperature.

Sodium hydroxide is now added over a period of 8 hours and the mass is then kept at 65° C. for 4 hours.

The reaction mixture is diluted with about 300 liters of methanol and is filtered in order to eliminate sodium chloride. The solvent is then evaporated.

By varying the amount of hydroxide, polycondensates having a variable $\eta_{sp}$ (determined in 1% solution of isopropanol at 25° C.) are obtained.

The characteristics of the polycondensates obtained are reported in the following Table 5:

TABLE 5

| Amount of NaOH added in kg. (theoretical amount required for neutralization: 31.2 kg.) | $\eta_{sp}$ |
|---|---|
| 31.2 | 0.28 |
| 31.7 | 0.22 |

Many variations and modifications can, of course, be made without departing from the scope and spirit of the present invention.

Having thus described the invention, what it is desired to secure and claim by Letters Patent is:

1. The process for regulating the molecular weight of basic nitrogen compounds obtained by polycondensation of (1) epichlorohydrin with (2) at least one member selected from the group consisting of primary aliphatic amines containing 3 to 30 carbon atoms and secondary aliphatic amines containing 4 to 60 carbon atoms and (3) a member selected from the group consisting of aliphatic, aromatic and heterocyclic secondary diamines, characterized in that after the termination of the polycondensation a molecular weight regulator selected from the group consisting of the hydroxides, carbonates and bicarbonates of ammonium, alkali metals and alkaline earth metals in an amount greater than that theoretically required for complete reaction with the ionic chloride formed in the polycondensation is added to the reaction mass and said reaction mass is heated.

2. The process according to claim 1, wherein the molecular weight regulator is an alkali metal compound.

3. The process according to claim 1, wherein the molecular weight regulator is an alkaline earth metal compound.

4. The process according to claim 1, wherein the molecular weight regulator is selected from the group consisting of the hydroxides, carbonates and bicarbonates of sodium, potassium, lithium, ammonium, rubidium, cesium, calcium, magnesium, strontium and barium.

5. The process according to claim 1, wherein the molecular weight regulator is employed in an amount of 1 to 100% in excess of the amount theoretically required for complete reaction with the ionic chlorine formed in the polycondensation reaction.

6. The process according to claim 1, wherein the basic nitrogen compound is obtained by the polycondensation of epichlorohydrin, octadecylamine and piperazine.

7. The process according to claim 1 wherein the basic nitrogen compound is obtained by the polycondensation of epichlorohydrin, dodecylamine and piperazine.

8. Basic nitrogen compounds prepared by the process according to claim 1.

9. A composition suitable for use in the production of shaped articles comprising a basic nitrogen polycondensate of controlled molecular weight produced by the process of claim 1 and polypropylene.

10. The process according to claim 1, wherein the molecular weight regulator is employed in an amount of about 2 to 7% in excess of the amount theoretically required for complete reaction with the ionic chlorine formed in the polycondensation reaction.

References Cited by the Examiner

UNITED STATES PATENTS

| 2,599,974 | 6/1952 | Carpenter et al. | 260—2 |
| 2,714,276 | 8/1955 | Landes | 260—2 |
| 3,031,505 | 4/1962 | Pollitzer | 260—2 |
| 3,107,228 | 10/1963 | Cappuccio et al. | 260—897 |

MURRAY TILLMAN, *Primary Examiner.*

E. B. WOODRUFF, *Assistant Examiner.*

Disclaimer

3,267,046.—*Albert Bonvicini*, Terni Italy. PROCESS FOR REGULATING THE MOLECULAR WEIGHT OF BASIC NITROGEN POLYCONDENSATES. Patent dated Aug. 16, 1966. Disclaimer filed Aug. 13, 1969, by the assignee, *Montecatini Edison S.p.A.*

Hereby enters this disclaimer to claim 9 of said patent.

[*Official Gazette December 9, 1969.*]